Oct. 21, 1969  H. SPÜHLER ET AL  3,473,395
DEVICE FOR IMPARTING CONTROLLED DISPLACEMENTS
TO MACHINE TOOL MEMBERS
Filed Nov. 24, 1967

HANSPETER SPÜHLER AND
WOLFGANG KOLB, INVENTORS

By Wenderoth, Lind & Ponack, Attys.

United States Patent Office 3,473,395
Patented Oct. 21, 1969

3,473,395
DEVICE FOR IMPARTING CONTROLLED DISPLACEMENTS TO MACHINE TOOL MEMBERS
Hanspeter Spühler, Zurich, and Wolfgang Kolb, Winterthur, Switzerland, assignors to Oerlikon-Buhrle Holding Ltd., Zurich, Switzerland
Filed Nov. 24, 1967, Ser. No. 685,513
Claims priority, application Switzerland, Nov. 30, 1966, 17,121
Int. Cl. F16h 25/12, 25/16
U.S. Cl. 74—57
7 Claims

ABSTRACT OF THE DISCLOSURE

A control device designed for the displacement of two bodies on a displacement track relatively to each other by means of a hydraulic motor. All the control elements are installed in the first body; in the second body there are teeth similar to those of a toothed rack, extending in regular intervals parallel to the displacement path. The hydraulic motor is regulated by a pushing element in connection with a control worm. The latter is rotatable and is set coaxially displaceable with the pushing element. Acted upon by an axial pressure the pushing element lies on the worm and the worm with its thread on the dogs. If the worm is set into rotation by a stepping motor which receives numerical orders, through the turning of the worm thread on the dogs the hydraulic motor starts functioning and prompts the first body under servo effect to compensate for the displacement of the worm, and/or of the pushing element following the orders received from the stepping motor.

---

The invention relates to a device for imparting controlled displacements of a driven body such as a carriage of a machine tool, relatively to another body such as a support on which the carriage is movably mounted.

In a known device for imparting controlled displacements (U.S. Patent 2,601,167) the screw surface of an axially displaceable worm engages a first worm wheel which is situated on a mutual axle with a second worm wheel, which axle is disposed rectangularly to the axis of the screw surface. The second worm wheel for his part engages the thread of a lead screw, the latter again being arranged parallelly to the guidance of the movable member, i.e. of the carriage of a lathe. In consequence the screw surface is only in an indirect manner, and with two changements of the direction of the transmission in connection with the lead screw. For that reason, the lead screw transmits the imparted rotative movement of a control motor to the drive of the worm, i.e. to the axially movable axle thereof, the more inexactly the longer the range of displacement and the greater the friction resistances of the transmission are.

It is an object of this invention to arrange a minimum of active parts between the dogs and the control means.

Another object of this invention is to provide a direct engagement of the screw surface of the worm with the dogs which are undeformably fixed in the frame member.

A further object is to provide means to reduce friction resistance at the said engagement point.

More specifically, it is an object of this invention to allow the construction of machine tools with a long path of displacement for the carriage by means of a long row of dogs.

A preferred embodiment of the device incorporated in part of a machine tool, is hereinafter described by way of example, with reference to the accompanying drawings in which—

Figure 1:
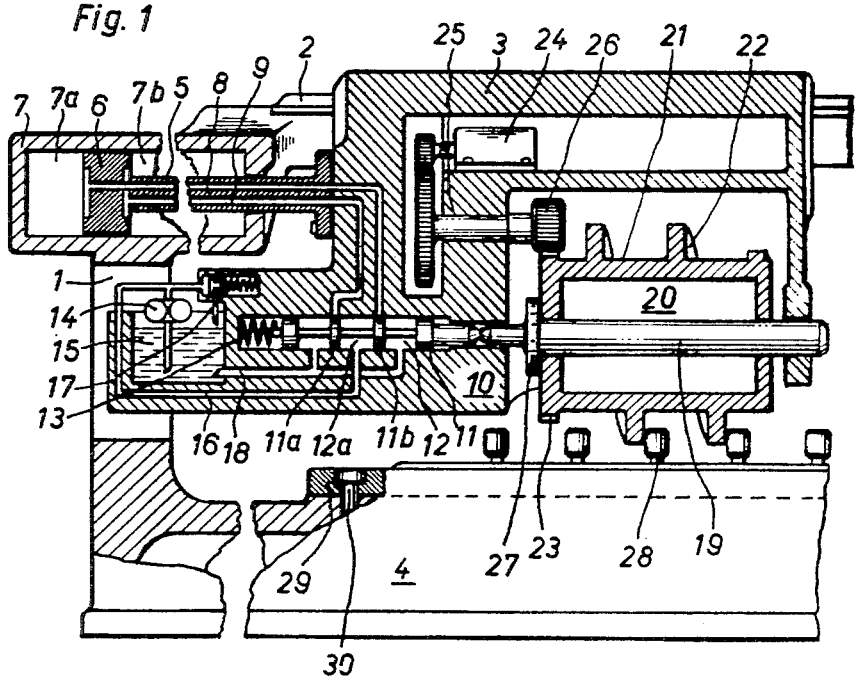
Figure 2:
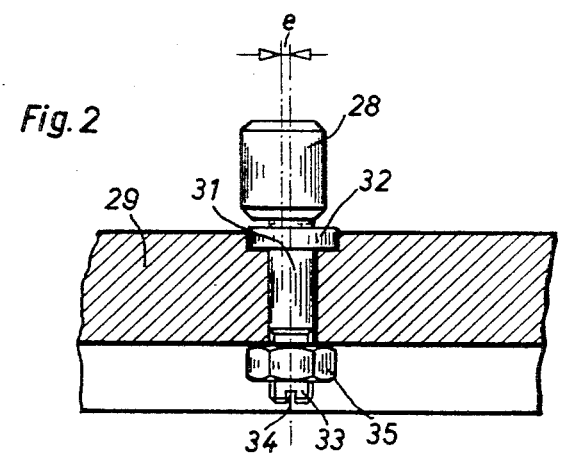

FIGURE 1 shows a diagrammatic partial view of part of a machine tool, partially in cross-section with a carriage displaceable on a guide (the latter in cross section, showing the arrangement of a servo control) and FIGURE 2 shows a detail from FIGURE 1 with regard to the securing of a rolling dog member to the support of base plate of the machine tool.

FIGURE 1 illustrates the head portion of a machine tool which portion contains the drive members for a carriage 3 which is displaceable on a guide 2. The guide 2 is additionally supported on the common base plate 4 by a second head portion which is not represented here but which is situated to the right in the drawing beyond the margin of the page. As a result, a solid machine frame is formed in the shape of a closed rectangle.

Secured to the carriage 3 is a piston rod 5 parallel to the guide 2. It carries a piston 6 at its free end. United with the head portion 1 is a cylinder 7 in which the piston 6 can reciprocate driven by pressure oil. The length of the cylinder 7 and of the piston rod 5 depends on the maximum range of displacement provided for the carriage 3. The transverse dividing line through the head portion 1 in the drawing indicates this relationship.

The two chambers 7a and 7b of the cylinder 7 are in communication, through pipelines 8 and 9, with a control member 11, 12, 13 which is housed in a block 10 integral with the carriage 3. A distributing slide valve 11 is situated in the bore 12 aligned parallel to the guide 2. A spring 13 exerts a pressure towards the right on the slide 11. In the neutral position, as the slide 11 is in the drawing, its two collars 11a and 11b close the two oil pipes 8 and 9. The chamber portion 12a of the bore 12 between the two collars 11a and 11b is subject to the pressure of a geared oil pump 14 which draws oil from a reservoir 15 traveling with the carriage 3 and transmits it through the pipeline 16. A pressure relief valve 17, which returns excess oil to the reservoir 15, serves to limit the pressure in the pressure line 16. Similarly, a return line 18 conveys oil displaced from the chamber 7a or 7b by the control member back to the reservoir 15.

Following on the distributing slide valve 11, abutting end to end, is a bearing shaft 19 which, like the slide 11, is aligned parallel to the guide 2 and is displaceable longitudinally. Concentrically on this shaft 19 is a hollow drum 20 from the cylindrical surface 21 of which there projects a helical thread 22. Likewise provided on the drum 20 is a spur gear 23 through which the drum 20 can be set in rotation. The spindle 19 and the drum 20 together with the helical thread 22 and the spur gear 23 form a feeler member 19, 20, 22, 23. A stepping motor 24, which travels with the carriage 3 and which is in communication, through a reduction gear 25 mounted in the carriage 3, and an elongated pinion 26 with the spur gear 23, is provided for the drive of the feeler member 19, 20, 22, 23. The drum 20 bears on the one hand at its end against a flange 27 on the bearing shaft 19 and on the other hand, with the helical surface 22, against dogs 28, under the loading of the spring 13.

These dogs 28 are disposed and secured jointly, at regular, finely adjustable intervals, on a solid bar 29 which may be designated as a supporting member, in a row parallel to the guide 2, like the teeth in a rack. The bar 29 itself is firmly bolted, by means of bolts 30, to the base plate 4 and is thus rigidly connected to the guide 2 through the head portion 1. The number of dogs 28 depends on the length of the maximum displacement travel provided for the carriage 3 and the lead of the helical thread 22, the spacing of the dogs 28 having to correspond to the lead of the helical thread 22. In order that there may be no interruption in the contact or in the engagement of the helical thread 22 with the dogs 28, at least two turns of the helical thread 22 are provided.

As FIGURE 2 shows, the dogs 28 are constructed and secured in a special manner. The dogs are provided in the form of rolling bodies, for example rolling bearings 28 with an outer sleeve, which are mounted on pins 31, rotatable in the bar 29, with an eccentricity e of a few hundredths of a millimetre. The pins 31 are provided with a collar 32, a thread 33 and an adjusting slit 34. A nut 35 secures each pin 31 in its precise, final position.

The mode of operation of a machine tool composed inter alia of components thus constructed and arranged, is as follows:

As a result of starting the oil pump 14, the hydraulic servo system, known per se is made ready for operation. In order that the oil pressure may not exceed a pre-selected amount, the pressure relief valve 17 ensures the return of the excess oil. At the same time, the oil passes through the pressure line 16, into the chamber 12a between the two collars 11a and 11b on the slide 11. If the latter is in its neutral position, in which it closes the pipelines 8 and 9, the piston 6, and hence the carriage 3, remains in that position in which it happens to be.

If the drum 20 is rotated in one direction or the other by the stepping motor 24, however, then in the first case, for example a rotation in counter clockwise direction (seen from the carriage 11), in accordance with the representation of the helical thread 22 in the drawing, the spring 13 displaces the distributing slide valve 11 and this displaces the shaft 19, or the flange 27 displaces the drum 20 towards the right, as a result of which contact with the rolling bodies 24 is maintained. In the second case, the rotation of the drum 20 in clockwise direction causes a displacement of the drum 20 towards the left so that the slide 11 is likewise displaced and the spring 13 is correspondingly compressed.

In both cases, the collars 11a and 11b have been displaced relatively to the mouths of the pipelines 8 and 9, in the control member 11, 12, 13. Accordingly, in the first case the pressure oil passes through the pipeline 8 into the chamber 7a and displaces the piston 6 towards the right. At the same time the piston 6 displaces the oil from the chamber 7b through the pipelines 9 and 18 past the slide collar 11a back into the reservoir 15.

The carriage 3 also travels towards the right with the piston 6, that is to say it follows the feeler member 19, 20, 22, 23 until this stops again and the slide 11 has again returned to its neutral position. The corresponding procedure takes place in the second case, that is to say when the stepping motor 24 is reversed. Then the feeler member 19, 20, 22, 23 displaces the distributing slide valve 11 towards the left until the carriage 3 has again overtaken the slide 11.

Now the smaller the masses to be moved by the stepping motor 24, that is to say the mass moment of inertia of the rotating parts such as the armature of the stepping motor 24, the reduction gear and the feeler member 19, 20, 22, 23 the more quickly does the whole control react. This condition is satisfied by the fact that the driving and controlling parts can be small and light in construction while the reduction from the stepping motor 24 to the drum 20 can be selected very great. The rolling bearings 28 likewise have a favourable influence on this in that they greatly reduce the friction at their contact points with the helical thread 22. For this reason, the driving power to be supplied by the stepping motor 24 is extremely low. If the number of steps of the stepping motor 24 is large, the helical thread 22 will wind itself forwards from rolling body 28 to rolling body and the carriage 3 will follow this movement directly and precisely with amplified power.

In this manner therefore, it is possible to drive the carriage 3, for example of a lathe, drilling machine, milling machine or planing machine, automatically, quickly and reliably into position by means of the stepping motor 24 through numerical instructions derived from a data store or to allow it to progress at a speed which can be selected and over a distance which can be pre-selected.

The main advantage of the present invention lies in the increase in the accuracy in the determination of travel and in the reaction speed of the control, the practicability of greater travel distances and displacement speeds of the carriage and all this with simultaneous simplification in construction and a reduction in manufacturing costs.

What we claim is:

1. Device for governing a driven displacement along a given path of a first body relative to a second body comprising a rotatable worm having a thread set axially displaceable in said first body, means to set said worm into rotation in said first body, means for displacing said first body while in contact with said worm, a lost motion connection connecting said worm to said second body, dogs in the form of rolling bodies secured to said second body to react against said thread and stop said lost motion.

2. Device for governing a driven displacement along a given path of a first body relative to a second body comprising a rotatable worm having a thread, set axially displaceable in said first body in parallel relation with said path, means to set said worm into rotation in said first body, means for displacing said first body while in contact with said worm, a lost motion connection connecting said worm to said second body, dogs in the form of rolling bodies mounted eccentrically on pins held in regular intervals parallel to said path in said second body, said pins being rotatable relative to said second body for fine adjustment of said intervals of said rolling bodies and means to secure said pins against rotation.

3. Device for governing according to claim 1, in which said rolling bodies are roller bearings, each having an outer sleeve directly engageable with said thread of said worm.

4. Device for governing according to claim 1, in which said first body is relatively displaceable to said second body along a given path, including control means incorporated in said first body axially moveable in parallel relation with said path and connected through a lost motion connection to said worm and being influenced by the latter, a drive, actuated through said control means for displacement of said first body, and an impulse controlled stepping motor incorporated in said first body for rotating said worm.

5. Device for governing according to claim 4 wherein a supporting shaft is provided on which is fixed said worm, coaxially arranged with said control means and being in contact with the shaft end of said control means, and also axially displaceable relative to said first body.

6. Device for governing a driven displacement along a given path of a first body relatively to a second body, comprising a rotatable worm having a thread with at least two turns of a given pitch, said worm being set axially displaceable in said first body in parallel relation with said path, a hydraulic motor interposed between said first and second body for the displacement of said first body, control means in said first body having a servo valve spool coaxially movable with said worm and governing said drive in the form of a hydraulic motor with an axial force acting on said servo valve spool in the direction of said worm, a lost motion connection connecting said servo valve spool to said worm and said worm to said second body, dogs in the form of rolling bodies which are secured to said second body mounted in regular intervals in the amount of said given pitch of turns, whereby two dogs of said dogs are simultaneously in reaction against said turns of said thread.

7. Device for governing according to claim 6, wherein said first body acts as a sliding carriage and said second body as bed of a machine tool, said sliding carriage being movable along a linear path on said bed.

(References on following page)

References Cited

UNITED STATES PATENTS

| | | | |
|---|---|---|---|
| 327,048 | 9/1885 | Wittram | 74—424.6 |
| 647,491 | 4/1900 | Hoffmann | 74—465 |
| 1,262,932 | 4/1918 | Egg | 74—464 |
| 1,323,301 | 12/1919 | Mardis | 90—21.5 |
| 2,367,492 | 1/1945 | Pickett et al. | 90—21.5 |
| 2,559,839 | 7/1951 | Andrew | 90—21.5 |
| 2,788,424 | 4/1957 | Huelskamp et al. | 74—57 |
| 2,904,120 | 6/1959 | Bidwell | 180—79.2 |

FRED C. MATTERN, Jr., Primary Examiner

W. S. RATLIFF, Jr., Assistant Examiner

U.S. Cl. X.R.

90—21.5